US010386832B2

(12) United States Patent
Maier et al.

(10) Patent No.: US 10,386,832 B2
(45) Date of Patent: Aug. 20, 2019

(54) REDUNDANT CONTROL SYSTEM FOR AN ACTUATOR AND METHOD FOR REDUNDANT CONTROL THEREOF

(71) Applicant: Siemens Aktiengesellschaft, Munich (DE)

(72) Inventors: Willi Maier, Oppenau (DE); Norbert Rottmann, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 169 days.

(21) Appl. No.: 15/446,672

(22) Filed: Mar. 1, 2017

(65) Prior Publication Data

US 2017/0255191 A1 Sep. 7, 2017

(30) Foreign Application Priority Data

Mar. 2, 2016 (EP) .................................... 16158266

(51) Int. Cl.
*G05B 23/02* (2006.01)
*G05B 19/05* (2006.01)
*G05B 9/03* (2006.01)

(52) U.S. Cl.
CPC ....... *G05B 23/0286* (2013.01); *G05B 19/052* (2013.01); *G05B 19/058* (2013.01);
(Continued)

(58) Field of Classification Search
CPC ................ G05B 19/052; G05B 19/058; G05B 2219/24173; G05B 2219/24182; G05B 23/0286; G05B 9/03
See application file for complete search history.

(56) References Cited

U.S. PATENT DOCUMENTS 4,872,106 A * 10/1989 Slater ...................... G06F 11/14
714/13
4,880,994 A * 11/1989 Richard ................... G05B 9/03
326/10

(Continued)

FOREIGN PATENT DOCUMENTS

DE 10 2004 034 451 A1 2/2006
EP 0 478 288 A2 4/1992
(Continued)

*Primary Examiner* — Abdelmoniem I Elamin
(74) *Attorney, Agent, or Firm* — Cozen O'Connor

(57) ABSTRACT

A method and redundant control system for an actuator in which two redundant control computers are connected via buses to a respective peripheral station containing an interface module and at least one periphery module, wherein the actuator is connected to mutually decoupled signal outputs of two periphery modules, each forming an output module, of the two peripheral stations, where output values generated by the two redundant control computers for the actuator are transmitted by the interface modules to the output modules, wherein upon detection of a bus fault, the respective interface module transmits a command to all downstream output modules to output substitute values, and where output modules to which the actuator is connected exchange information about receipt of the command via a communication link and implement it only if another output module concerned has also received the command so as to prevent failure modes in redundant operation.

6 Claims, 2 Drawing Sheets

(52) U.S. Cl.
 CPC ...... *G05B 9/03* (2013.01); *G05B 2219/24173* (2013.01); *G05B 2219/24182* (2013.01)

(56) References Cited

U.S. PATENT DOCUMENTS

| | | | | |
|---|---|---|---|---|
| 4,958,270 | A | * | 9/1990 | McLaughlin ............ G05B 9/03 700/82 |
| 5,202,822 | A | | 4/1993 | McLaughlin et al. |
| 8,260,492 | B2 | * | 9/2012 | Stange ..................... G05B 9/03 701/33.7 |
| 9,593,696 | B2 | * | 3/2017 | Kim ...................... F15B 15/125 |
| 9,990,286 | B1 | * | 6/2018 | McLaughlin ....... G06F 12/0806 |
| 10,042,330 | B2 | * | 8/2018 | McLaughlin ............ G05B 9/03 |
| 2011/0264242 | A1 | * | 10/2011 | Nakagawa ............... G05B 9/03 700/21 |
| 2014/0238231 | A1 | * | 8/2014 | Kim ...................... F15B 15/125 92/33 |
| 2014/0328028 | A1 | | 11/2014 | Maier et al. |
| 2015/0000515 | A1 | * | 1/2015 | Sobolewski ........ F15B 15/125 92/33 |
| 2015/0134082 | A1 | | 5/2015 | Grosch et al. |
| 2017/0218983 | A1 | * | 8/2017 | Sobolewski ........ F15B 15/125 |

FOREIGN PATENT DOCUMENTS

| | | |
|---|---|---|
| EP | 2 799 947 A1 | 11/2014 |
| EP | 2 806 316 A1 | 11/2014 |
| EP | 2 860 598 A1 | 4/2015 |
| WO | WO 2005/057306 A1 | 6/2005 |

\* cited by examiner

REDUNDANT CONTROL SYSTEM FOR AN ACTUATOR AND METHOD FOR REDUNDANT CONTROL THEREOF

BACKGROUND OF THE INVENTION

1. Field of the Invention

The present invention relates to control systems and, more particularly, to a redundant control system.

2. Description of the Related Art

Process control systems, such as SIMATIC PCS 7 from Siemens, serve to automate processes in technical systems and are usually hierarchically structured by way of several layers. At field level, the states of the technical process are recorded (sensors) and/or the process specifically influenced (actuators) by field devices. At control level, control computers (stored program controls with CPU units) perform control and regulatory functions in proximity to the field, where they receive input values from the sensors, e.g., a pressure transducer, and deliver output values to the actuators, e.g., a positioner for a control valve. At process management level, superordinate control and regulation of the process occurs in host computers.

Data exchange between field devices and control computers usually occurs via a digital field bus, such as PROFIBUS DP or PROFINET. As field devices do not normally have a corresponding field bus connection themselves, they are connected to the field bus via decentralized peripheral stations. A peripheral station consists of an interface module (header module) for connection to the field bus and a number of periphery modules (digital and analog input and output modules) for connection of the field devices. The periphery modules may have one or more channels, to each of which a field device can be connected.

A high-availability system, as known from DE 10 2004 034 451 A1 or WO 2005/057306 A1, for example, possesses redundantly designed central functions and is assembled with two separate control computers. In so-called "hot standby" operation, if uninterrupted the two control computers process the same control program simultaneously, but with only one control computer active and controlling the process with its output values. In the event of a fault, the intact control computer assumes control of the process alone. The output values of the two control computers are supplied to the actuator via separate output modules, where, as shown by DE 10 2004 034 451 A1, decoupling diodes effect an OR link of digital output values and/or an addition of analog output values at the signal outputs of the output modules. For the exchange of information, e.g., in the form of status and alignment information, redundancy coupling is provided, via which the control computers are interconnected.

In the case of the redundant control system known from WO 2005/057306 A1, the first control computer is connected via a first bus to an interface module of a first peripheral station, such as ET200M from Siemens, which has at least one periphery module. The second redundant control computer is connected via a second bus to an interface module of a second peripheral station which likewise has at least one periphery module. The actuator is arranged at signal outputs of two periphery modules that form output modules and are arranged in different peripheral stations. Each of the interface modules of the two peripheral stations is designed to transmit output values received over the bus from the respective control computer for the actuator to the respective output module for output to the actuator. Each of the output modules is designed to detect and report a malfunction at its signal output to the control computer to enable a changeover to the uninterrupted peripheral unit.

EP 0 478 288 A2 discloses a redundant automation system for an actuator that is connected to mutually decoupled signal outputs of two output modules. Both output modules are connected to two redundant control computers via a common bus.

EP 2 806 316 A1 discloses a redundant automation system for a sensor, which is connected redundantly to two periphery modules arranged in different peripheral stations. Both peripheral stations contain one interface module each, with which they are connected to an automation device via a common bus.

EP 2 799 947 A1 discloses an arrangement with a redundancy adapter unit to connect a field device, e.g., actuator, redundantly to two periphery modules arranged in different peripheral stations.

EP 2 860 598 A1 discloses a redundant automation system for sensors and actuators that are connected to a peripheral station. The peripheral station is connected via a bus to two subsystems, such as automation devices, which, as also known from the aforementioned DE 10 2004 034 451 A1 or WO 2005/057306 A1, process the same control program cyclically and synchronously and are connected to each other for this purpose via a synchronization connection. Here, only one subsystem is also active, where a changeover is made to the other subsystem in the event of a fault. To avoid the changeover from interrupting the technical process to be controlled, a dead time may occur at the outputs of the connected periphery during which the outputs persist with their last valid process output values.

A problem for redundancy operation is produced by the determination of a particular reaction of the system when a device upstream of the output model, such as when the control computer or the field bus is interrupted or fails. In a PCS7 system, such a field bus interruption and/or such a failure is detected by the interface module of the peripheral station in order to subsequently prompt all the output modules of the peripheral station to freeze the most recently received output values via a command ("Output Disable" command). In the aforementioned redundancy operation with two control computers and two decentralized peripheral stations, this means that in the event of a malfunction of the hitherto active control computer the output value last output by it is kept at the signal output of the downstream output module, while the output module downstream of the hitherto inactive and now active control computer outputs the current output values. In the case of analog output, the actuator then receives the sum of the frozen and the current output value and in the case of digital output, in the worst case, the logical value "one" permanently. The established reaction mechanism therefore results in a complete redundancy failure.

One possible solution to the foregoing problem is to arrange an additional digital output module in each of the two peripheral stations as an auxiliary module which, upon receiving the "Output Disable" command, triggers an external switching relay to disconnect the output module provided for the redundancy operation from the power supply. As a result, the signal output of the output module is forcibly brought into a current-free and voltage-free state that cannot influence the output value supplied by the other redundant output module by way of the OR link.

Although this measure solves the problem, albeit with increased effort, it has the disadvantage that when their power supply is removed, the redundant output modules behave in an uncontrollable and undefined manner for a relatively long period, preventing a rapid changeover to the other redundant output module.

SUMMARY OF THE INVENTION

In view of the foregoing, it is an object of the invention to solve the aforementioned problem by providing a redundant control system and a method which also enable a rapid changeover between redundant output modules.

This and other objects and advantages are achieved in accordance with the invention by a redundant control system for an actuator, with having a first control computer that is connected via a first bus to an interface module of a first peripheral station containing at least one periphery module, and a second redundant control computer that is connected via a second bus to an interface module of a second peripheral station likewise containing at least one periphery module, where the actuator is connected to mutually decoupled signal outputs of two periphery modules, each forming an output module, of the two peripheral stations, each of the interface modules being configured to transmit output values received for the actuator from the respective control computer via the bus to the output module for output to the actuator and, on detection of a fault on the part of the bus, being configured to transmit a command to the output module and to all other output modules of the peripheral station to output substitute values at their signal outputs, and where moreover the two output modules with signal outputs to which the actuator is connected are interconnected via a communication link and are configured to exchange information about the receipt of a command for the output of a substitute value and to implement this command only if the other output module concerned has also received such a command.

It is also an object of the invention to provide a method for the redundant control of an actuator in a control system in which a first control computer is connected via a first bus to an interface module of a first peripheral station containing at least one periphery module, a second redundant control computer is connected via a second bus to an interface module of a second peripheral station likewise containing at least one periphery module, and the actuator is connected to mutually decoupled signal outputs of two periphery modules, each forming an output module, of the two peripheral stations, where each of the interface modules transmits output values for the actuator received from the respective control computer via the bus to the output module for output to the actuator and, on detection of a fault on the part of the bus, transmits a command to the output module and to all other output modules of the peripheral station to output substitute values to their signal outputs, and where moreover the two output modules with signal outputs to which the actuator is connected exchange information via a communication link about receipt of a command for outputting a substitute value and implement this command only if the other output module concerned has also received such a command.

The substitute value may be, in particular, the most recently received output value but also another parameterizable value distinguishable from the operational output values.

The output modules of the redundant control system in accordance with the invention may equally be digital or analog output modules.

If the two redundant output modules have a multichannel configuration, the restriction to implement a command for the output of a substitute value only if the other output module concerned has also received such a command only applies to those channels to which the actuator is connected via diodes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made hereinafter to the drawings in which.

DETAILED DESCRIPTION OF THE EXEMPLARY EMBODIMENTS

Figure 1:
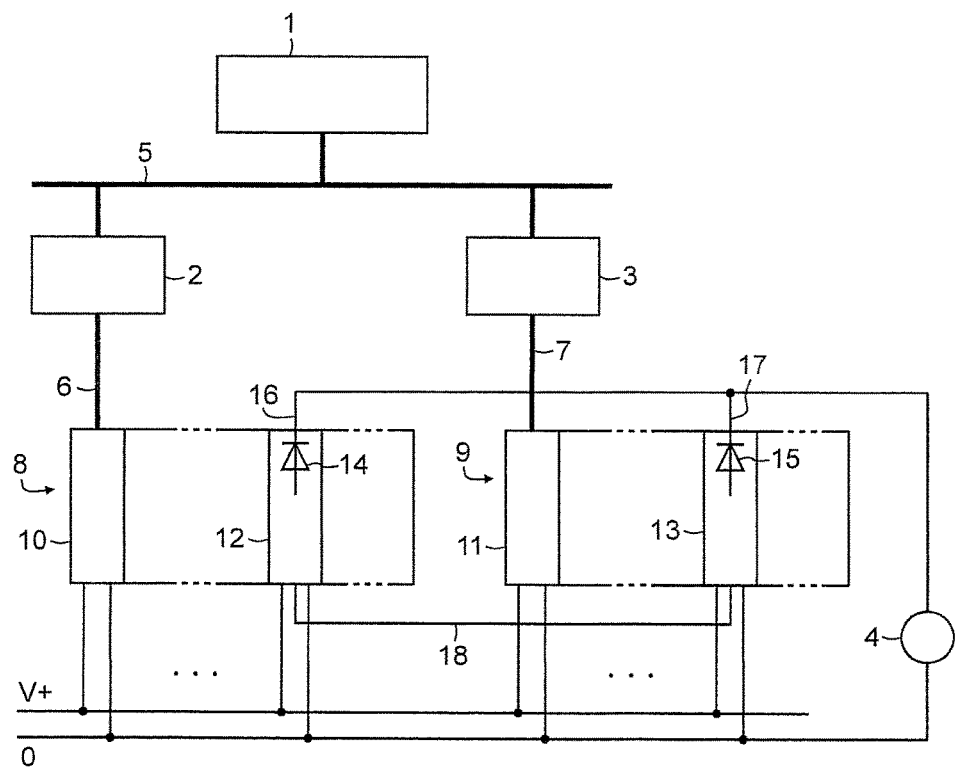
FIG. 1 shows an exemplary embodiment of the redundant control system in accordance with the invention in a diagrammatic block representation.

With reference to FIG. 1, shown is a section of a process control system with a controlling system 1 in a process management level, a first and second control computer 2, 3 in the form of memory-programmable controls in a control level and an actuator 4 at field level. The field level contains further field devices (not shown) which, in the form of sensors, record the states of a technical process and, formed as actuators, specifically influence the process. The controlling system 1 and the control computers 2, 3 are interconnected via a plant bus 5 (e.g., Ethernet). To generate output values for the actuator 4, the two control computers 2, 3 each execute one and the same control or user program in redundancy operation, inter alia, processing input data received from sensors over separate digital field buses 6, 7 (e.g., PROFIBUS DP). The field devices are connected to the field buses 6, 7 of the two control computers 2, 3 via a first and a second decentralized peripheral station 8, 9. Each of the two peripheral stations 8, 9 comprises an interface module (header module) 10, 11 for connection to the respective field bus 6, 7 and a number of single or multichannel periphery modules, of which only one respective output module 12, 13 is shown here. The actuator 4 is connected to the signal outputs 16, 17 of the two output modules 12, 13 via decoupling diodes 14, 15. The interface modules 10, 11 transmit output values that they receive from the respective control computer 2, 3 for the actuator 4 to the output module 12, 13, where the diodes 14, 15 link digital values disjunctively (OR) and add analog values (currents) for the actuator 4. Both output modules 12, 13 are active. They both receive the same output values in error-free redundancy operation. The two control computers 2, 3 synchronize themselves accordingly.

The interface modules 10, 11 each monitor the respective field bus 6, 7, to which they are connected and, in the event of a fault, such as in the event of failure of the control computer (e.g., operating status STOP, or cable disconnected), issue a command to all output modules of the peripheral station 8, 9 concerned to output substitute values, such as in the form of the most recently received output values. This behavior is necessary in non-redundant operation. In redundant operation, however, this leads to a faulty operating status. The output modules 12, 13 supplying the actuator 4 redundantly with output values therefore implement this command only if, and as long as, they both receive such a command. To make this possible, they exchange information about the receipt of a command for the output of a substitute value via a communication link (e.g., RS485). This prevents the actuator 4, for example, from receiving the sum of a current analog output value and an output value frozen at the time of the command instead of a current analog output value.

Figure 2:
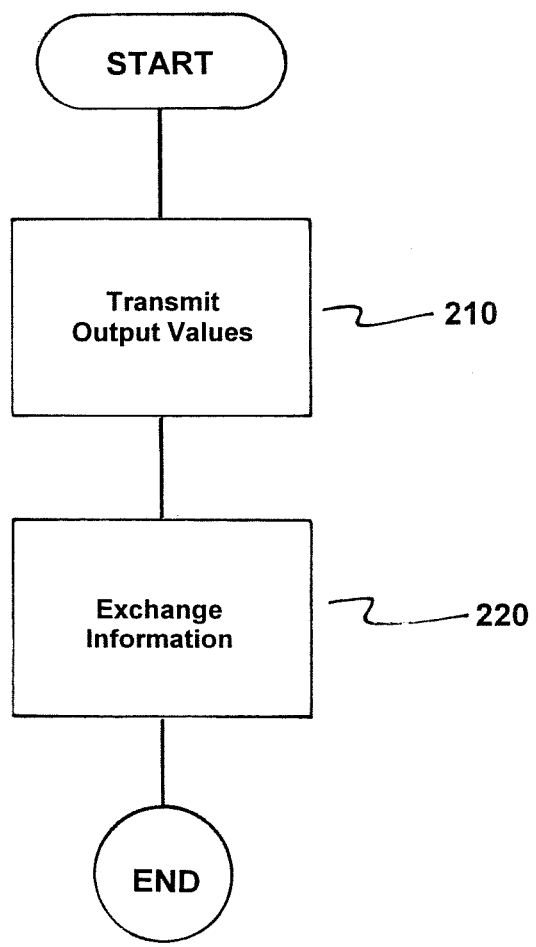
FIG. 2 is a flowchart of the method in accordance with the invention.

FIG. 2 is a flowchart of a method for redundant control of an actuator 4 in a control system, in which a first control computer 2 is connected via a first bus 6 to a first interface module 10 of a first peripheral station 8 containing at least one periphery module, a second redundant control computer 3 is connected via a second bus 7 to a second interface module 11 of a second peripheral station 9 containing at least one periphery module, and the actuator 4 is connected to mutually decoupled signal outputs 16, 17 of two periphery modules, each forming an output module 12, 13, of the first and second peripheral stations 8, 9.

The method comprises transmitting by the first and second interface modules 10, 11 output values for the actuator 4 received from a respective control computer 2, 3 via the first bus 6 or second bus 7 to the output module 12, 13 for output to the actuator 4 and, upon detection of a fault on the first bus 6 or second bus 8, transmitting a command to the output module 12, 13 and all other output modules of the peripheral station 8, 9 to output substitute values to their signal outputs 16, 17, as indicated in step 210.

The output modules (12, 13) with signal outputs (16, 17) to which the actuator (4) is connected now exchange information about receipt of a command for output of a substitute value via a communication link (18) and implementing this command only if another output module concerned has also received said a command, as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A redundant control system for an actuator, comprising:
a first control computer connected via a first bus to a first interface module of a first peripheral station containing at least one periphery module;
a second redundant control computer connected via a second bus to a second interface module of a second peripheral station containing at least one periphery module,
wherein the actuator is connected to mutually decoupled signal outputs of two periphery modules, each forming an output module, of the first and second peripheral stations, respectively;
wherein the first and second interface modules transmit output values received for the actuator from a respective control computer via the first bus or second bus to the output module for output to the actuator and, upon detection of a fault on the first bus or second bus, transmit a command to the output module and all other output modules of the peripheral station to output substitute values at their signal outputs; and
wherein each respective output module with signal outputs to which the actuator are connected is interlinked via a communication link and exchanges information about receipt of a command for outputting a substitute value and implements this command only if another output module concerned has also received said command.

2. The redundant control system as claimed in claim 1, wherein each respective output module comprises a digital output module.

3. The redundant control system as claimed in claim 1, wherein each respective output module comprises an analog output module.

4. The redundant control system as claimed in claim 1, wherein if each respective output module has a multichannel configuration, then each respective output module implements a command received for outputting a substitute value only for those channels with signal outputs to which the actuator is connected, with a restriction that another output module has also received said a command.

5. A method for redundant control of an actuator in a control system, in which a first control computer is connected via a first bus to a first interface module of a first peripheral station containing at least one periphery module, a second redundant control computer is connected via a second bus to a second interface module of a second peripheral station containing at least one periphery module, and the actuator is connected to mutually decoupled signal outputs of two periphery modules, each forming an output module, of the first and second peripheral stations, the method comprising:
transmitting by the first and second interface modules output values for the actuator received from a respective control computer via the first bus or second bus to the output module for output to the actuator and, upon detection of a fault on the first bus or second bus, transmitting a command to the output module and all other output modules of the peripheral station to output substitute values to their signal outputs; and
exchanging between the output modules with signal outputs to which the actuator is connected information about receipt of a command for output of a substitute value via a communication link and implementing this command only if another output module concerned has also received said a command.

6. The method as claimed in claim 5, wherein if the output modules have a multichannel configuration, then the output modules implement the received command for output of the substitute value only for those channels with signal outputs to which the actuator is connected, with a restriction that the other output module has also received said command.

* * * * *